Sept. 2, 1941. A. J. MOLLART ET AL 2,254,972
UNIVERSAL JOINT
Filed May 29, 1940
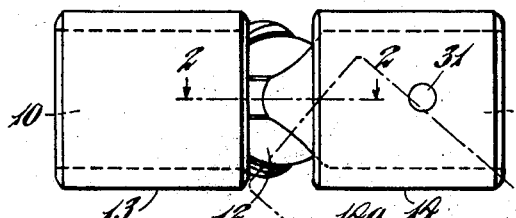
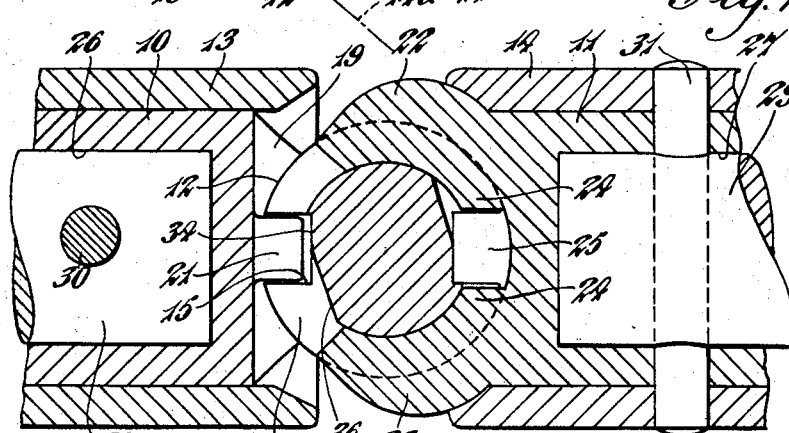
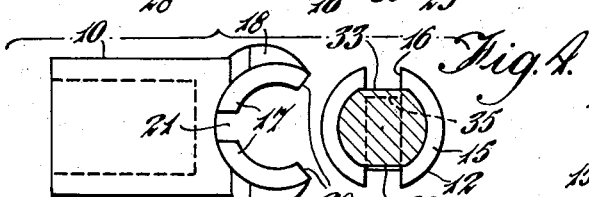
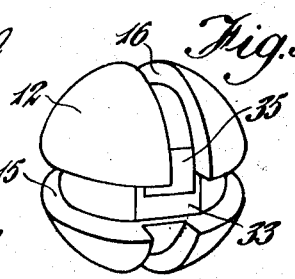
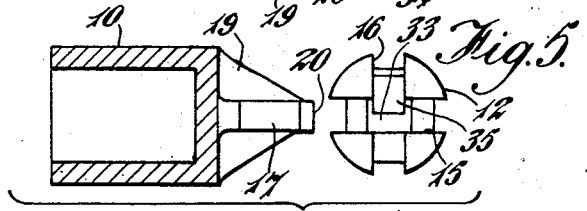
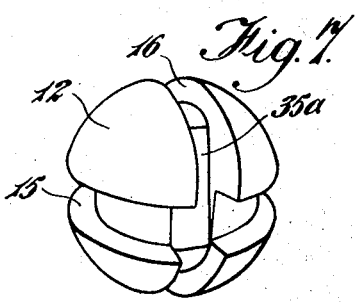
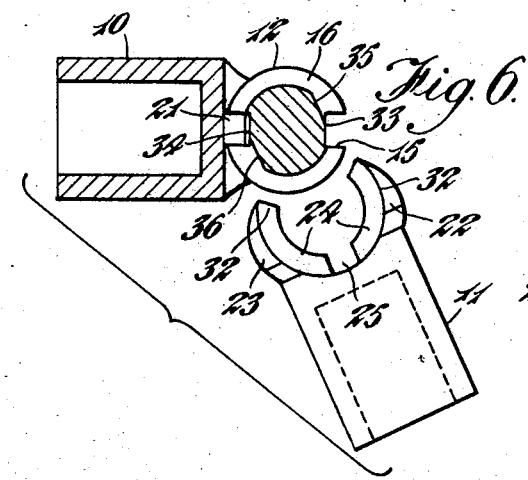
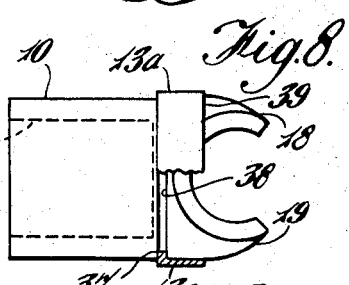
INVENTORS
ARTHUR J. MOLLART AND
JOHN C. HENDRA
By: Stevens and Davis
ATTYS.

Patented Sept. 2, 1941

2,254,972

UNITED STATES PATENT OFFICE 2,254,972

UNIVERSAL JOINT

Arthur John Mollart and John Charles Hendra, Surbiton, England

Application May 29, 1940, Serial No. 337,906
In Great Britain June 24, 1939

5 Claims. (Cl. 64—16)

This invention relates to universal joints, and more particularly to those of the kind in which an intermediate ball member is formed with two circumferential grooves in planes which are substantially at right angles, these grooves being engaged slidably by the arms of a pair of forked members which are mounted upon the shafts or spindles required to be universally jointed.

Such joints have previously been proposed in which the ball member is formed, at the two positions where the grooves intersect, with a pair of flats in the "bottoms" of the grooves for the purpose of enabling the tips of the fork arms to be passed into position when the joint is being assembled, the said flats being disposed in mutually parallel planes, both lying at right angles to the general planes of the two grooves. With this arrangement the ball member can readily be engaged with one of the forked members, but it is necessary to bring the second forked member to a position in which its axis lies at right angles to that of the first in order that the tips of its arms may be slid past the two flats, said second forked member subsequently being swung to its normal position coaxial with the first. The fact that the forked members have to be disposed at right angles to one another in this way to effect assembly has been found to be disadvantageous as it necessitates certain weaknesses in the design of the coupling; thus either the arms of the second forked member have to be made thinner and narrower than is otherwise called for, in order to permit said second forked member to be engaged fully with the ball member; alternatively it is possible to make these arms more robust, but then, in order to provide the necessary clearance for assembly, the first forked member has to be cut away between its arms which latter are consequently weakened.

It is the object of the present invention to avoid this difficulty by shaping the ball member with flats or other equivalent means for locally deepening the grooves, which flats or equivalent enable the second forked member to be assembled upon the ball member while its axis is disposed obliquely with respect to the axis of the first forked member.

As a further object the invention sets out to provide an improved construction of universal joint which is exceptionally robust, and is capable of transmitting a relatively large torsional load for its size.

According to the present invention there is provided a universal joint comprising a pair of forked members, to and from which, respectively, the drive is taken, a ball member formed with a pair of circumferential grooves disposed in planes mutually at right angles, a pair of fork arms formed integrally with each forked member and arranged to embrace the ball member engaging with the corresponding groove thereof through more than 180° so that the tips of the fork arms are spaced apart by a distance less than the bottom diameter of the said groove, and a locally deepened portion within one of the grooves of the ball member, the base of which deepened portion is directed obliquely with respect to the general plane of the other circumferential groove, so as to permit the forked members to be assembled upon the ball member while the axes of said forked members are disposed at an inclination, with an included angle substantially greater than a right angle.

The invention is illustrated by way of example in the accompanying drawing, in which:

Figure 1 is a side elevation of an improved universal joint;

Figure 2 is a fragmentary sectional plan taken on the line 2—2 of Figure 1, and drawn to an enlarged scale;

Figure 3 is a perspective view of the ball member;

Figures 4, 5 and 6 are various views to illustrate the operation of assembling the joint, Figure 4 being a side elevation of one forked member and the ball member, which latter is shown in section; Figure 5 is a plan corresponding to Figure 4 but showing the forked member in section; while Figure 6 is a plan corresponding to Figure 5 to show the attachment of the second forked member;

Figure 7 is a perspective view of a modified construction of ball member; and

Figure 8 is a side elevation of a forked member showing a modified construction, partly in section.

The universal joint comprises a pair of forked members 10 and 11 which are connected together operatively by a ball member 12, and which are fitted with outer sleeves 13 and 14 respectively, these, in addition to enhancing the appearance, being adapted to limit positively the angular deflection of the joint. The limiting position of the sleeve 14 is indicated in broken lines at 14a, and it will be seen that the edge of the sleeve rides upon the corresponding edge of the sleeve 13.

As will be seen from Figure 3, the ball member 12 is formed with a pair of circumferential grooves 15 and 16 which extend in planes disposed substantially at right angles to one another. The groove 15 in the ball member is slidably engaged by a spline 17 extending around the inside of a pair of arms 18 and 19, which latter are formed integrally with the forked member 10 and are substantially triangular in shape, as will be seen most clearly in Figures 4 and 5. This provides the arms 18 and 19 with exceptional strength consistent with lightness and thus enables the joint to transmit a comparatively heavy torsional load. The tip portions 20 of the spline 17 are arranged so that the latter subtends at the centre of the ball member 12 an angle which is substantially greater than 180°, thus positively preventing the parts of the joint from being separable when longitudinal tension is applied to the joint. The spline 17 is interrupted at 21 merely for convenience in assembly, as will be hereinafter explained. In a similar manner the forked member 11 (see Figure 2) is formed integrally with arms 22 and 23 of triangular shape, which arms have an internal curved spline 24 engaging slidably with the groove 16 of the ball member 12. The spline 24 is interrupted at 25, as will be seen most clearly in Figure 6, but this is merely for convenience in manufacture, as it enables the forked members 10 and 11 to be interchangeable. The forked members 10 and 11 are bored at 26 and 27 for attachment to the shafts or spindles 28 and 29 respectively, which are secured by driving pins 30 and 31 adapted also to hold the sleeves 13 and 14 in position.

Owing to the fact that the splines 17 and 24 both embrace the grooves in the ball member 12 through more than 180°, provision has to be made for enabling the joint to be assembled, and for this purpose the ball member 12 has its grooves 15 and 16 both deepened locally at positions which are out of the range of movement of the tips 20 upon the forked member 10 and of the corresponding parts of the forked member 11, indicated at 32. This effect is produced by forming a pair of "flats" 33 and 34 at diametrically opposite positions in the bottom of the groove 15, said flats being arranged at the positions where the groove 16 intersects the groove 15. The flats 33 and 34 are of course parallel with one another and each lies in a plane which is at right angles both to the general plane of the groove 16 and that of the groove 15. The groove 16 is also deepened locally by a pair of flats 35 and 36 which are also disposed at diametrically opposite positions and are parallel with one another. The flats 35 and 36 are, moreover, disposed adjacent the intersection of the grooves 15 and 16, but they are inclined at less than a right angle to the plane of the groove 15.

With the grooves 15 and 16 deepened in this manner the joint can be readily assembled by following the steps shown in Figures 4 and 5 and in Figure 6. Bearing in mind that Figures 4 and 5 show the same parts in elevation and plan respectively, the ball member 12 is placed in the position shown, which enables it to be slid to the left between the tip portions 20 of the arms 18 and 19, due of course to the provision of the flats 33 and 34. The ball member 12 is then turned through a right angle in a clockwise direction when viewed as in Figure 4, and this brings the ball member 12 to the position shown in Figure 6. It will be noted that the flats 33 and 34 are now well outside the range of the tips 20, so that the ball member 12 is positively held by the arms 18 and 19. The second forked member 11 is then brought into the inclined position shown in Figure 6, which position, it will be noted, is beyond the inclination permitted by the sleeves 13 and 14 when the joint is fully assembled. The inclined flats 35 and 36 allow the forked member 11 to be slid into position, so that the spline 24 enters into full working engagement with the groove 16. It will be seen that the left-hand tip 32 of the spline 24 has to enter the gap 21 in the spline 17. By swiveling the forked member 11 more or less into alignment with the forked member 10, the tip portions 32 are brought out of engagement with the flats 35 and 36 and of course the subsequent fitting of the sleeves 13 and 14 prevents said tip portions 32 from again coming into register with the flats 35 and 36.

A modified method of forming the ball member 12 is shown in Figure 7, in which the groove 16 is locally deepened by relatively large flats, one of which is indicated at 35a. These flats are formed at the appropriate inclination corresponding substantially to that of the flats 35 and 36 in the previous example, but they extend completely across the width of the groove 15, thus in effect deepening the latter at the two positions where it intersects the groove 16. Thus both grooves 15 and 16 can be deepened merely by the formation of two flats and the construction is thereby simplified. It is conceivable that the invention can be carried into effect by deepening each of the grooves at one side only, the parts being suitably shaped to provide such clearances as are necessary to enable assembly to be effected.

In an alternative construction, the flats or equivalent positions of local deepening may be so positioned that after assembly of the forks, each flat or equivalent can be exposed for access by appropriate rocking of a fork and can be, so to speak, filled in by a removable packing piece which, when in position, completes the circular formation of the groove floor. In such case, the angle adopted for assembly may be within the operational limiting angle.

A modified and rather stronger construction of forked member is shown in Figure 8, in which excess angular deflection of one forked member relative to the other is prevented by the provision, upon each, of a sleeve 13a. This is conveniently in the form of a split band of spring steel having an inward flange 37 which engages with a circumferential groove 38 in the forked member 10, thus locating the sleeve 13a in an axial direction and enabling its edge 39 to engage with the corresponding edge upon the other forked member. By this means the joint can be made stronger for a given outside diameter and can be bored as at 26 to take a larger shaft than in the preceding examples.

What we claim is:

1. A universal joint comprising a pair of forked members, to and from which, respectively, the drive is taken, a ball member formed with a pair of circumferential grooves disposed in planes mutually at right angles, a pair of fork arms formed integrally with each forked member and arranged to embrace the ball member, engaging with the corresponding groove thereof through more than 180° so that the tips of the fork arms are spaced apart by a distance less than the bottom diameter of the said groove, and a locally deepened portion in one of the grooves of the ball member, produced by forming a flat in the base of the groove, which flat is directed obliquely with respect to the general plane of the other circumferential groove, so as to permit the forked members to be assembled upon the ball member while the axes of said forked members are disposed at an inclination, with an included angle substantially greater than a right angle.

2. A universal joint comprising a pair of forked members, to and from which, respectively, the drive is taken, a ball member formed with a pair of circumferential grooves disposed in planes mutually at right angles, a pair of fork arms formed integrally with each forked member and arranged to embrace the ball member, engaging with the corresponding groove thereof through more than 180° so that the tips of the fork arms are spaced apart by a distance less than the bottom diameter of the said groove, and a pair of diametrically opposite locally deepened portions in one of the grooves of the ball member, produced by forming mutually parallel flats in the base of the groove, which flats are directed obliquely with respect to the general plane of the other circumferential groove, so as to permit the forked members to be assembled upon the ball member while the axes of said forked members are disposed at an inclination, with an included angle substantially greater than a right angle.

3. A universal joint comprising a pair of forked members, to and from which, respectively, the drive is taken, a ball member formed with a pair of circumferential grooves disposed in planes mutually at right angles, a pair of fork arms formed integrally with each forked member and arranged to embrace the ball member, engaging with the corresponding groove thereof through more than 180° so that the tips of the fork arms are spaced apart by a distance less than the bottom diameter of the said groove, a pair of flats formed at diametrically opposite positions in the base of one groove of the ball member, said flats being disposed at right angles to the general planes of both grooves, and another pair of flats adjacent the first pair but arranged in the base of the other groove and disposed in planes inclined at less than a right angle with respect to the general plane of the said one groove, so as to permit the forked members to be assembled upon the ball member while the axes of said forked members are disposed at an inclination, with an included angle substantially greater than a right angle.

4. A universal joint comprising a pair of forked members, to and from which, respectively, the drive is taken, a ball member formed with a pair of circumferential grooves disposed in planes mutually at right angles, a pair of fork arms formed integrally with each forked member and arranged to embrace the ball member, engaging with the corresponding groove thereof through more than 180° so that the tips of the fork arms are spaced apart by a distance less than the bottom diameter of the said groove, and a pair of diametrically opposite and mutually parallel flats forming locally deepened portions formed in the base of one of the grooves of the ball member, which flats extend completely across the other groove and are both directed obliquely with respect to the general plane of the other circumferential groove, so as to permit the forked members to be assembled upon the ball member while the axes of said forked members are disposed at an inclination, with an included angle substantially greater than a right angle.

5. A universal joint comprising a pair of forked members, to and from which, respectively, the drive is taken, a ball member formed with a pair of circumferential grooves disposed in planes mutually at right angles, a pair of fork arms formed integrally with each forked member and arranged to embrace the ball member, engaging with the corresponding groove thereof through more than 180° so that the tips of the fork arms are spaced apart by a distance less than the bottom diameter of the said groove, a locally deepened portion within one of the grooves of the ball member, the base of which deepened portion is directed obliquely with respect to the general plane of the other circumferential groove, so as to permit the forked members to be assembled upon the ball member while the axes of said forked members are disposed at an inclination, with an included angle substantially greater than a right angle, a circumferential groove extending around each of the forked members and a pair of sleeves fitted into the said circumferential grooves in the forked members, and arranged to co-act and limit the angular deflection of the forked members thus preventing their disengagement from the ball member during use.

ARTHUR JOHN MOLLART.
JOHN CHARLES HENDRA.